Patented Nov. 1, 1938

2,134,917

UNITED STATES PATENT OFFICE 2,134,917

ANTIPARASITIC COMPOSITIONS

Benjamin R. Harris, Chicago, Ill.

No Drawing. Application July 11, 1935,
Serial No. 30,880

3 Claims. (Cl. 167—34)

My invention relates to improvements in the preparation of fungicides, insecticides and the like and is particularly concerned with improved compositions which are employed in the treatment of plants, household animals and for combating fungus diseases and insect infestations.

It is well known that insecticidal, fungicidal and similar compositions have a widespread use for horticultural and agricultural purposes, where they are used in the form of sprays or the like, for the combating of plant diseases, for the extermination of insects and parasites, for use as sheep dips, and for many other similar purposes. In the class of insecticides, it is known that certain types of such materials or compositions are stomach or internal poisons. Insects of the type which eat plant tissues are destroyed by distributing over the surfaces of the plant material such stomach or internal poisons with the result that when such plant material is eaten by the insects, the latter are killed. There is another class of insecticides which destroys the insects by suffocating or paralyzing them. In this case, when the insects suck or pierce the epidermis of a leaf or plant tissue having distributed thereover the particular type of insecticide in question, said insecticide comes into direct contact with the body or tissues of the insects thereby inducing suffocation and paralysis thereof. Still another class of insecticides is ovicidal and destroys the eggs of the insects by coming into direct contact with said eggs. My invention relates to the improving of the functioning of the various types of fungicides and insecticides.

It is well known that when a fungicide, insecticide or the like is in contact with a substance which makes possible a better spreading, wetting or penetration of the active or potent ingredient or ingredients on the surface of the plant tissue, insect, insect eggs or the like, a more effective result is obtained. Among the speading, wetting and penetrating agents which have heretofore been used are soaps, sulphonated oils such as Turkey-red oil and sulphonated mineral oils, reaction products of alkylolamines and higher fatty acids, glue, gelatine, gums, polyhydroxy alcohols such as glycerine and glycol partially esterified with high molecular weight organic acids, and numerous other materials, all of which possess a specific and certain degree of utility in their respective fields.

I have discovered an entirely new class of substances for the present purposes which has marked spreading, wetting and penetrating properties in compositions of the type previously discussed and which renders very efficacious the employment of insecticidal, fungicidal and similar compositions for the destruction of insects, insect eggs, fungi and similar pests or undesirable growths.

It is accordingly an object of my invention to provide a new class of chemical substances for the purpose of improving the action of fungicidal and insecticidal and similar compositions.

A further object of my invention is the preparation of new and useful compositions for combating fungus diseases, insect growths and infestations, and for the treatment of plant and animal life.

A still further object is to provide new and useful fungicidal and/or insecticidal materials.

Another object is to improve or enhance the action of recognized fungicides and insecticides.

With these objects in view and others which will become apparent as the description proceeds, I turn now to a consideration of the various aspects of my present invention.

In general, all of the substances which I add to the fungicidal or insecticidal composition or the like are interface modifying agents of a type characterized by their containing in the molecule a lipophilic or oil-wetting group comprising a straight chain aliphatic or cyclic radical of relatively high molecular weight and a hydrophilic or water-wetting group such as sulphate, sulphonic acid, sulpho-fatty acid, phosphate, phosphonic acid and similar radicals, as well as amine and hydroxy radicals. In general, the lipophilic radical should contain at least six carbon atoms. The hydrophilic group must bear such a relation to the lipophilic portion of the molecule or be of such a nature as to "balance" the lipophilic portion of the molecule so as to produce compounds with the desired interface modifying characteristics which render them suitable for the present specific purposes. The lipophilic and hydrophilic groups should preferably be at the terminal portions of the molecule. The lipophilic group, as stated, has a marked affinity for oils and fats, is readily capable of being wet by oleaginous media and, in general, at the water-oil interface, in systems containing oil and water, tends to cause the molecule, of which it is a part, so to orientate itself, apparently that the lipophilic group may stand in relatively closer proximity to the oil medium or phase, as contrasted with the aqueous medium. In those cases where, for example, hydroxy groups form the hydrophilic portion of the molecule, a sufficient number thereof must be present to bear the necessary quantitative relation to or "balance" the particular lipophilic radical or radicals which are present in the molecule, since the hydroxy group possesses less hydrophilic characteristics than is possessed by, for example, phosphate or sulphate groups. In view of the fact that some nitrogenous substances, particularly those containing a choline group, tend to decompose, I prefer not to employ substances of that character in my present invention. Wherever I employ the term "non-nitrogenous", however, it will be understood that I do not mean to exclude salts of ammonia or the alkylolamines.

Among the substances which are within the scope of my invention are sulphuric acid or sulpho-acetic or sulpho-butyric acid esters or sulphonic acid derivatives of a water soluble polyhydroxy substance, at least one of the hydroxy groups of the polyhydroxy substance being esterified with a higher normal chain or branch chain relatively high molecular weight organic acid such as the relatively high molecular weight organic acids such as the higher fatty acids and naphthenic acids. Instead of esters, the ethers may be employed resulting from etherifying the polyhydroxy substances with alcohols or their derivatives corresponding to the higher organic acids employed in forming the esters. The polyhydroxy substances may be chosen from the class including glycerol, glycols, polyglycerols such as di- or triglycerol or mixtures thereof, polyglycols such as diethylene glycol, sugars, sugar alcohols such as mannitol and sorbitol, and polyhydroxy-carboxylic acids such as tartaric acid, gluconic acid, mucic acid, glyceric acid, citric acid, malic acid, carboxylic oxidation products of polyglycerols and polyhydroxy substances, and similar substances. Among the higher molecular weight fatty acids which are employed to form the esters with the polyhydroxy substances are the coconut oil fatty acids such as lauric and myristic acids, oleic acid, linoleic acid, palmitic acid, stearic acid; and in case the ethers are employed, the alcohols corresponding thereto or their derivatives are utilized. The saturated and unsaturated higher fatty acids and their corresponding alcohols or other derivatives may be effectively employed in the formation of the compounds which I have found to be excellent spreading, dispersing and penetrating agents in insecticidal and similar compositions. As source materials for the lipophile group or groups, I may employ any of the conventional tri-glyceride oils and fats of commerce, whether hydrogenated or not, such as cottonseed oil, corn oil, palm oil, sunflower oil, hempseed oil, sardine oil, and animal oils such as lard, tallow and neat's foot oil. In addition, I may employ those waxes which are esters of mono-atomic alcohols such as beeswax and spermaceti.

As I have already indicated, my compounds contain a polyhydroxy substance wherein at least one hydroxy group is esterified or etherified with a higher molecular weight organic acid or alcohol or the like (lipophilic radical) and at least one of the remaining hydroxy groups of the polyhydroxy substance is reacted with a substance to produce in the molecule a hydrophilic group such as a sulphuric acid, sulphonic acid or phosphoric acid radical, or the hydrophilic part of the molecule may be carried by a plurality of hydroxy groups in which case no other hydrophilic groups may be present. Sulphuric acid, sulphuryl chloride, chlorsulphonic acid, phosphoric acid, $P_2O_5$, $POCl_3$, and similar materials may be used to introduce the desired hydrophilic groups into the molecule. The compounds may be used as such or they may be partially or completely neutralized with an alkali such as sodium, potassium or ammonium hydroxides or carbonates or with amines such as the alkylol-amines including mono-, di-, or tri-ethanolamine or mixtures thereof, or heterocyclic nitrogenous substances such as pyridine, piperidine, quinoline, etc.

Instead of neutralizing the compounds with the above mentioned alkaline materials, I may utilize a base such as nicotine. In this situation, I obtain compounds having unique properties. Thus, for example, coconut oil fatty acid esters of diethylene glycol sulphated and neutralized partially or completely with nicotine will produce an insecticide which possesses both dispersing and insecticidal properties in the same molecule of the substance and which may be dispersed in kerosene, oil or water or in any other suitable media. In producing such a substance, coconut oil may be re-esterified with diethylene glycol in proportion sufficient to produce substantially the mono-acid ester, and the reaction mixture is then treated with chlorsulphonic acid to sulphate a substantial portion of the esters. The product is then neutralized either partially or completely with nicotine, or it may be partially neutralized with nicotine and partially neutralized with another neutralizing agent such as those indicated above. It will be appreciated that, instead of nicotine, other bases having, in themselves, insecticidal or fungicidal properties may similarly be employed.

I may also use a group of substances such as the alkyl sulphates or sulphonates in which the alkyl group contains between eight and sixteen carbon atoms, the sulphate or sulphonic acid group being neutralized with an alkaline material such as, for example, sodium, ammonium, or calcium.

The following compounds are specific embodiments of the addition agents which I have described more generally hereinabove which are effective for the present purposes:

1. Mono-oleyl glycerol sulphate (ammonium salt)
2. Mono and/or di coconut oil fatty acid glycerol sulphate (sodium, ammonium, or ethanolamine salt)
3. Distearyl ester of glucose mono-sulphate (sodium salt)
4. Normal decane-1-sulphonic acid (sodium salt)
5. Coconut oil mono-fatty acid esters of diethylene glycol sulphate (sodium or ethanolamine salt)
6. Soya bean oil fatty acid esters of glycol sulphate (amine salt)
7. Coconut oil mono-fatty acid esters of polyglycerols, the ester containing free hydroxy groups
8. Products obtained by re-esterification of corn oil or coconut oil with glycerine, polyglycerols, ethylene glycol or di- or poly ethylene glycol, the products being subsequently sulphated by reaction with chlorsulphonic acid or sulphur trioxide and then neutralized with a substance of an alkaline nature.
9. Cholesteryl ester of betaine hydrochloride
10. Palmityl ester of betaine hydrobromide 11. 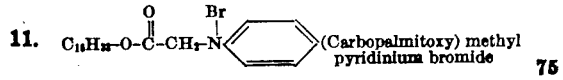 (Carbopalmitoxy) methyl pyridinium bromide 12. Melissyl ester of betaine hydrobromide

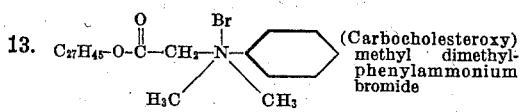

14. Cholesteryl dimethyl-aminoacetate hydrobromide

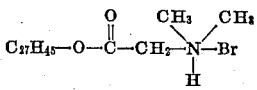

15. Palmityl ester of dimethylaminoacetic acid hydrobromide

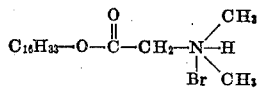

16. Monostearine sulphoacetate sodium salt
17. Palmityl sulphoacetate (sodium salt)

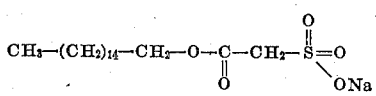

18. Stearic acid ester of dextrose
19. Stearic acid esters of polyglycerols

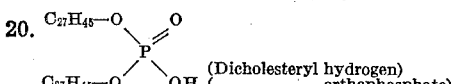

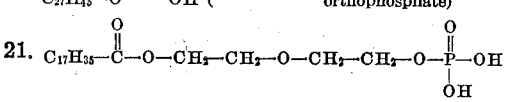

22a. Stearyl creatinine (sodium salt)

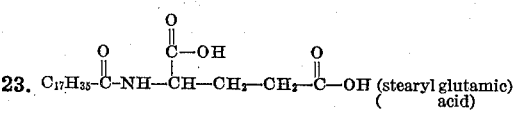

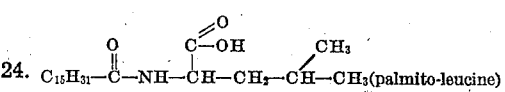

25. Monostearyl sucrose
26. Stearyl tartaric acid
27. Mannitol monopalmitate
28. Stearyl citric acid (sodium salt)
29. Mucic acid monopalmitate
30. Stearyl malic acid,

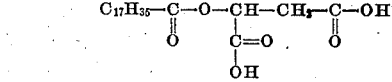

The following specific examples illustrate the preparation of insecticide and fungicidal compositions with the use of an interface modifying agent such as I have disclosed herein. It will be appreciated that these examples are illustrative only and are not to be taken as limitative of the present invention.

A. Two pounds of the coconut oil mono-fatty acid ester of diethyleneglycol sulphuric acid ester sodium salt, containing a proportion of the unsulphated ester are dispersed in two pounds of water. Ninety pounds of a kerosene oil fraction and six pounds of water are then stirred into the first solution simultaneously and gradually. A stiff, stable paste is obtained which, immediately before spraying, is diluted with 5000 or less pounds of water.

B. In fifty pounds of a pyrethrum extract in a kerosene fraction are dissolved two pounds of a soya bean oil fatty acid ester of glycol sulphate triethanolamine salt. Before spraying, this solution is diluted and mixed with 3000 pounds of water.

C. Two pounds of mono oleic acid ester of glyceryl sulphate ammonium salt are dissolved in two pounds of a kerosene oil fraction and six pounds of water containing two and one-half pounds of nicotine sulphate are then stirred into the first solution simultaneously and gradually. The paste thus obtained is diluted and mixed with 5000 or less pounds of water shortly before spraying.

D. Ten gallons of creosote are admixed with 150 pounds of coconut oil mono-fatty acid esters of diethylene glycol neutralized with ethanolamine, a homogeneous liquid resulting. To employ this as a sheep dip, it is necessary only to thin it out with the desired quantity of water. The sheep dip represented herein possesses numerous advantages over sheep dips heretofore employed. Heretofore, sheep dips have been prepared using rosin soaps and fatty acid soaps as spreaders. These possessed the disadvantage of requiring the use of soft water in order to prevent precipitation of the soap. Moreover, even if soft water were employed, the calcium and magnesium salts present in the perspiration or sweat exuded by the sheep caused the precipitation of the soap in the same way as was effected by the same salts in the water. More important than this, however, is the fact that alkalinity decreases the phenol coefficient of the creosote which is effective because of its content of tar acids which contain phenol and phenol-like substances. With the use of my interface modifying agents, such as indicated above, the sheep dip may be neutral in reaction or even slightly on the acid side with the result that the phenol coefficient of the creosote is enhanced and the matter of insoluble soap precipitates is obviated.

In my invention the fungicide or insecticide is incorporated in the specific penetrating and spreading agent of my invention and the new composition of matter may be used either in the form of a water solution such as, for example, a solution containing nicotine sulphate, or in a liquid such as, for example, a composition containing kerosene or other mineral oil material with an oil-soluble penetrating agent. Similarly, my addition agents may be employed together with an oily liquid containing, beside mineral oil, another insecticide such as pyrethrum extract. Again, I may employ a composition which contains a mineral oil, another insecticidal agent such as pyrethrum extract or derris root extract in combination with one or more of my penetrating and spreading agents together with aqueous liquid, such as water, or a composition of matter containing mineral oil, which is insecticidal in its nature, dispersed in water, with one or more of my penetrating and spreading agents which acts both as a dispersing agent for the components of the composition containing the oil and also functions as a penetrating and spreading agent when applied to the plant tissue or insect.

Many of my interface modifying substances act simultaneously as wetting and/or penetrating and oil dispersing agents in a continuous water phase. When paraffin or kerosene oil fractions of a desired boiling range are the insecticidal ingredients of the preparation, the added wetting agent will act also as an oil dispersing agent as it is wetted by the oil as well as by the water phase and it will become substantially dissolved in the oil when the preparation is applied in the form of a spray on the plant tissue or upon the insects; and the water will evaporate, thus effecting a better spreading and penetration of the oil on the surface of the tissue by virtue of the fact that it contains the dissolved wetting agent which will reduce the surface tension between the oil and the surface of the tissue containing moisture. In this manner, it makes the composition containing the oil and water phase more potent and more effective. Another characteristic of many of my interface modifiers described herein consists in that they will not be precipitated by lime or magnesium salts which are present in hard water. In this manner they are superior to the soap spreaders used heretofore which are affected by hard water. Another advantage of my wetting agents and penetrating agents used in this invention consists in the fact that they will make substantially stable oil dispersions in neutral solutions. In the cases where soaps or alkali caseinates have been used, the medium is alkaline and in those cases where injury to foliage is caused by alkaline substances, it is obvious that such alkaline materials are highly unsuitable and undesirable. My interface modifying agents are also very effective in those situations where aqueous solutions of fungicides or insecticides are employed. For example, in the use of an aqueous solution of a substance such as nicotine sulphate as a spray for foliage or the like, considerable difficulty is encountered in obtaining an effective wetting or penetrating of the foliage proper due to a natural protective wax-like coating thereon. Similarly, many insects are provided with waxy or wax-like coatings which act as a barrier to obtaining the desired contact between the potent ingredient of the insecticide which is necessary to insure effective results. With the use of my interface modifiers, the angle of contact between the foliage or the body of the insect, as the case may be, and the aqueous or oleaginous material of the fungicide or insecticide is decreased to such an extent as to enable effective wetting or impregnation of the plant or animal tissue whereby the desired protective or destructive effects of the insecticidal or fungicidal substances are obtained. Another advantage of my surface modifying agents is their freedom from causing or bringing about the "burning" of plant tissues. By reason of their excellent wetting and spreading properties, a ready distribution of the fungicidal or insecticidal substances is obtained thereby preventing building up unduly high concentrations of such materials with the consequent harm to foliage or the like.

In the case of nicotine sulphate which is employed in the form of a water solution, my interface modifying agents possess a marked efficacy. Where soap is used as a spreader in such a solution, the soap is decomposed to form free fatty acids and free nicotine precipitates out in the solution. The undesirable features of this result are manifest. In the first place the effectiveness of the soap is lost. Secondly, the presence of the free fatty acids makes it difficult to apply the solution to the plant material or the like from a purely mechanical or manipulating standpoint. Thirdly, the nicotine, being present in the form of discrete globules or particles, tends to become concentrated in local areas on the surfaces of the plant material, resulting in ineffective and uneven coverage with the consequent deleterious and undesirable effects enuring therefrom. The addition of more soap, aside from the cost and inconvenience, is of little aid in placing the precipitated free nicotine back into solution. With the use of my surface modifying agents in place of soap, however, the nicotine sulphate remains in solution in molecular dispersion with all of the attendant advantages resulting therefrom. My compositions of matter which include a fungicide or insecticide in combination with a wetting and/or penetrating and/or dispersing agent, may be applied in the form of a powder or liquid for horticultural uses or in the form of a spray, or, for the treatment of animals, in the form of a bath in which the animal is dipped. Fungicides, stomach poisons, contact insecticides, such as pyrethrum extract, derris root extract, cube root extract or nicotine salts or synthetic nicotine substitutes in addition to the isecticidal mineral oil, may be used in combination with aqueous media. The fungicides or insecticides may be water or oil-soluble and can be incorporated either in the water or in the oil phase of a composition, during or prior to the dispersing of the oil in the water phase by means of my wetting agents. My wetting agents or surface modifiers may be used in concentrations from .05% to 2% or more based on the weight of the composition as a whole in the preparation of the above described insecticidal and fungicidal sprays. Stock solutions of the insecticidal preparations may be made which contain larger proportions—as much as 10% to 20% of my surface modifiers—to be diluted subsequently with water before use.

In some cases it is advisable to use as a spray a water solution of a potent insecticide like nicotine. In this case in order to get better wetting and penetration I have found it advisable to add the interface modifiers, as described above, which are soluble or dispersible in water. Instead of nicotine, copper sulphate or other well-known water soluble chemicals having fungicidal or insecticidal properties can be employed. The resulting solutions containing my interface modifiers have the property to wet and penetrate more efficiently than similar solutions made up in absence of these modifiers. Other preparations may be made containing varying concentrations of oil and other potent insecticides. Thus a preparation may be made by using twenty-five parts of oil of a kerosene fraction containing pyrethrum extract, twenty parts of corn oil fatty acid esters of glycerine sulphate sodium salts and sixty-five parts of water. This preparation is then diluted before spraying in the ratio one to two hundred or 1:400 or more parts of water. In place of the corn oil fatty acid esters of glycerine sulphate I can use coconut oil fatty acid esters of diethylene glycol sulphate neutralized with triethanol amine and the preparation made neutral with acid.

I have found that, whenever pyrethrum extract is used in a preparation such as shown above, made up in a stock solution in concentrated form and kept for a considerable length of time before use, it is not advisable to have the same in an alkaline medium as the potency of the insecticide—pyrethrum—will become decreased. It is for this reason that soaps or alkali caseinates used heretofore are detrimental as the alkalinity reduces the potency of the pyrethrum on standing. I, therefore, can use in my invention substances which will disperse the oil extract of pyrethrum in water in a neutral or even slightly acid medium thus preserving the potency of the preparation.

As I have set out in considerable detail above, the addition agents of my invention are characterized by the presence in the molecule of two groups, one of which is lipophilic and the other of which is hydrophilic in character, these two groups being present in a state of "balance". Although my description is sufficiently exhaustive so as to enable those skilled in the art to select at a glance compounds which will be effective for the present purposes, still I have devised a simple test which will enable any person to definitely ascertain the utility of any compound for the purposes of the present invention. This test, which is called the "spoon test", will definitely fix whether a compound is "balanced", and may be carried out as follows: From 0.05 to 0.10 gram of the material or substance in question is introduced into a porcelain mortar, wetted and ground into a solution or smooth paste with a pestle with a minimal proportion of water; two to five drops generally suffice.

An ordinary margarine, such for example as one made from vegetable oils and fats and cultured skimmed milk and which possesses the usual property of spattering during frying, is selected. 10 grams of this margarine are then introduced in small portions into the mortar and macerated thoroughly with the material first prepared until the entire 10 gram portion is thoroughly and uniformly intermixed with the material in the mortar. 2 grams of this mixture are introduced into a tablespoon and held directly over a free flame such as for example a Bunsen flame, one or two inches long, in such a position that the point of the flame just about reaches the bottom of the spoon. A clean sheet of paper is placed on the bottom of the burner by inserting the stem of the Bunsen burner prior to lighting through a hole made in the center of the paper and allowing the paper to drop to the base of the burner to catch the margarine splashed out during heating. The mixture in the spoon is heated until all of the water boils off and the ebullition ceases and the spots on the paper observed.

If this treated margarine spots the paper to the same extent as the untreated margarine from which the former was prepared, then the lipophile and the hydrophile groups of the compound are not balanced. The number and size of spots on the paper or the added weight can be readily determined.

If the increase in weight of the paper or the number and character of the spots produced on the paper up until all the water has boiled off are less than that produced by similarly heating two grams of the original untreated margarine employed for the test, then the material or substance in question has balanced hydrophile-lipophile groups. The expression "balanced lipophile and hydrophile groups" used in the claims is to be interpreted in terms of the above described "spoon test" when construed in the light of the entire disclosure.

In making the test usually not more than 2% by weight of the compound need be introduced into the test margarine, because as a rule, if this amount does not materially affect the spattering, the compound is not of great value. I have made certain observations, however, which may be helpful to the chemist in making his calculations. If the compound is in a pure state, I have found that as far as anti-spattering power is concerned, the proportion used is of minor importance, at least between certain ranges. I found, for example, that in very active compounds, .05% of the compound is almost as effective as 2%. If the compound is obtained in an impure state, admixed with substances having no anti-spattering power, then a relatively larger amount may have to be used. In making the test for balance, therefore, the amount of substance added to the margarine should be preferably calculated on the basis of the actual amount of supposed anti-spattering substance present. When the investigator is in doubt of the purity of the compound, it is also advisable to use a slightly higher percentage.

There may be other methods devised to determine the hydrophile-lipophile balance of organic compounds, but because of its simplicity I have chosen the above described "spoon test" for use in doubtful cases. If it requires more than 3% of a compound to reduce the spattering of margarine, then the compound will probably be rather ineffective for my present purposes.

Although the substances which may be successfully employed in my invention have been described in considerable detail, I refer those skilled in the art to my patents, Nos. 1,917,250; 1,917,251; 1,917,252; 1,917,253; 1,917,255; 1,917,256; 1,917,257 1,917,258; 1,917,259; and 1,917,260, wherein may be found a more comprehensive discussion of the nature of the compounds which I utilize herein. It will be understood that I may employ any of the compounds described in these patents for the purposes of the present invention, naturally, however, with varying degrees of efficacy.

It must not be inferred that the addition agents or substances which I employ herein need be pure substances. On the contrary, in many instances they are not pure substances but are reaction products of sulphating or sulphonating agents such as sulphuric acid or chlorsulphonic acid on higher fatty acid esters, such as coconut oil fatty acid esters of glycerine, glycol, diethylene glycol, polyglycerols, etc., which may be neutralized in part at least with an alkali. Indeed, in some cases, I have found that reaction mixtures produce more satisfactory results than do the pure substances. A notable example of this is in the case of derivatives of diethylene glycol. Pure coconut oil mono-fatty acid esters of diethylene glycol sulphate, while effective for my present purposes, exercise a noticeably improved effect when admixed with a proportion of coconut oil fatty acid esters of diethylene glycol, the latter being present as a part of the reaction mass when the former compounds are prepared as indicated above. The mixture possesses improved surface tension reducing characteristics and wetting out properties.

I have also found that the addition of certain materials to the substances with which my invention is concerned, as hereinabove described, markedly enhances their capacity to lower the surface tension of water, their serviceability as "wetting-out agents" in the present relation, and markedly improves many of their other valuable colloidal properties. These addition agents are principally the more or less lipophile ethers and esters of the hydroxy organic substances which I employ for esterifying with sulphuric acid or its equivalent in order to produce the esters or ethers or the like described hereinabove. Notably useful for this purpose are mono-oleyl diethylene glycol, mixed mono-acid esters of diethylene glycol with mixed coconut fatty acids, mixed mono acid esters of glycerol with mixed coconut fatty acids, mono caprylin and the like.

Thus the addition agents are hydrophilic lipins characterized by being aliphatic derivatives of water soluble polyhydroxy substances having at least one free OH group. While these hydrophilic lipins in themselves may not be sufficiently balanced to have a marked effect either to prevent spattering of oleomargarine or decrease interfacial tension in water-oil mixtures as in the case of the hydrophilic lipins containing a semi-esterified sulphuric acid or similar group, they will have the effect of so modifying the surface pheonomena of the latter in contact with an aqueous medium so as to affect the interfacial surface, surface tension and the penetrating and wetting properties. For a more complete disclosure of the class of hydrophilic lipins I call attention to my Patent Reissue No. 19,425.

I have made extensive experiments to determine the effect of the addition agents in increasing the wetting properties of my new compounds. It will be sufficient for an understanding of this phase of the invention to give a few illustrative examples. In the case of mono-olein disulphate which in itself is a good wetting agent, I found that substituting for some of the mono-olein di-sulphate in the treating bath approximately 40% of mono-oleyl diethylene glycol produced greatly improved wetting action. For example, in the case of the mono-olein di-sulphate, one-tenth of a gram dissolved in 100 cc.'s of water showed a surface tension of 40 dynes per centimeter. With six one-hundredths of a gram of mono-olein di-sulphate and four one-hundredths of a gram of mono-olein diethylene glycol also dissolved in 100 cc.'s of water, I found that the surface tension was decreased to 34 dynes per centimeter. In the same way, I found that while sulphates of mixed coconut fatty acid esters of diethylene glycol were good wetting agents, the wetting action was greatly increased by the addition of a proportion of mono-oleyl diethylene glycol. In the case of mono-laurin sulphate used as a wetting agent, I found that I also obtained improved results by the use therewith of a proportion of mono-caprylin. The surface tension of water under the conditions in which the above data were established was 72 dynes per centimeter. By selecting one of the compounds of my present invention and a suitable addition agent of the class hereinabove described, I have found that very much better wetting action is obtained than by the use of any other known wetting agent with which I am familiar.

It will be noted that while my esters and ethers and the like, in themselves, produce a considerable lowering of surface tension, this effect is enhanced by the addition of the fatty acid esters, notwithstanding the fact that the concentration of the first mentioned ester or ether or the like proper is diminished.

It is to be noted that while I have chosen the lowering of the surface tension of water as a convenient means of illustrating the effect of these addition agents, this surface tension lowering is by no means their sole effect as they radically influence other valuable colloidal characteristics of the medium into which they are introduced as well as influencing the surface tension.

As has been stated above, the substances generally described and specifically enumerated are very effective for my present purposes. Furthermore, as stated, they may be employed in the pure or impure state or an admixture of more than one of said substances may be employed.

In Patent No. 1,917,256, I have illustrated my nonnitrogenous compounds by the formula $(R(O)_wX_v)_zY$ in which R stands for a lipophile residue, O stands for oxygen, $w$, $v$ and $z$ are whole numbers, Y represents a cation, and X stands for sulphur in the form of its oxygen-acid radicals. In a more limited aspect, I have represented my non-nitrogenous substances by the formula

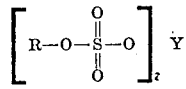

in which R is a lipophile residue balanced by the sulphate radical, Y represents a cation and $z$ is a whole number.

In Patent No. 1,917,257, I have stated that my substances may be non-nitrogenous chemicals having balanced lipophile and hydrophile groups, the hydrophile function being exercised primarily by at least one-OX group linked to carbon, wherein X stands for an innocuous cation, and the lipophile function being exercised primarily by a fatty acid radical having at least eight carbon atoms. Representative of such substances disclosed in said patent are mono-stearyl glucose, stearyl malic acid, and octoyl tartaric acid (sodium salt).

In Patent No. 1,917,258, I have disclosed a group of nitrogenous substances which are devoid of the linkage —O—X—O—(CH$_2$)$_w$—N— wherein X stands for phosphorus or sulphur in the form of their oxygenated acid radicals, $w$ is a small whole number, and N is tri-valent or penta-valent nitrogen, the terminal oxygen being linked directly to carbon. This group of substances, devoid of the linkage just discussed, is shown to be represented by the formula

wherein L is a lipophile radical in the form of an alkyl or alkoxy group or derivative of an alkyl or alkoxy group, and R represents a balancing nitrogeneous hydrophile group. Examples of such substances disclosed in this patent are palmityl glycine, cholesterol ester of betained chloride (carbopalmitoxy) methyl pyridinium bromide, etc.

In Patent No. 1,917,259, I have disclosed a class of phosphorus containing substances represented by the structural formula

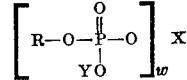

wherein X is a cation, Y is either a cation or an organic radical, $w$ is a small whole number, and R is an organic lipophile radical with at least four carbon atoms. Representative substances coming under this generic formula and disclosed in said patent are stearyl diethylene glycol dihydrogen orthophosphate, di-cholesterol hydrogen orthophosphate, etc.

As I have stated above, all of these substances may be employed for my present purposes. It will be appreciated, however, that the efficacy will vary with the different specific compounds.

Although I have described my inter-facial modifying substances for use in insecticidal and fungicidal and like compositions, it is evident that they may be similarly employed to enhance the effectiveness of antiseptic and disinfectant materials in water solution or not. Among the disinfectants or antiseptics, the action of which is favorably affected by the addition thereto of the interfacial modifying agents of my invention, are the hypochlorites and the organic chlorine derivatives such as chloramine T, substances of the type of hexylresorcinol, germicidal dyes such as acriflavine, bactericidal substances such as the mercurials and arsenicals including the water-soluble mercury derivatives, and the like.

Wherever the term "anti-parasite" is used in the claims, it will be understood to cover either insecticides or fungicides or similar materials which serve to inhibit the growth of or destroy insects, insect eggs, fungus growths or similar undesirable plant or animal life. I include also within the definition of this term antiseptic, disinfectant and bactericidal materials. Similarly, wherever the term "anti-parasitic composition" is used in the claims, it will be understood to cover compositions possessing fungicidal, insecticidal, antiseptic, disinfectant and bactericidal properties and which serve to accomplish the same general results as enure from the use of "anti-parasite" substances.

Wherever the term "higher organic acid" or "higher fatty acid" is used in the claims, it will be understood to mean compounds or radicals containing at least six carbon atoms.

Wherever the term "polyhydroxy substance" is used in this specification or claims, it will be understood to include substances containing at least two hydroxy groups and these may be hydroxy groups as such or those which are present as a part of a carboxylic acid group. Thus, for example, malic, citric, lactic and gluconic acids are "polyhydroxy substances" within the meaning of this specification.

I have described my invention in considerable detail, but it will be understood that the invention has been described in terms of description and not in terms of limitation. I do not limit myself, therefore, other than by the terms of the appended claims.

What I claim as new and desire to protect by Letters Patent of the United States is:

1. An anti-parasitic composition comprising a nicotine salt of a monosulphate of an aliphatic polyhydric alcohol partial fatty acid ester, the fatty acid radical containing between six and eighteen carbon atoms.

2. An anti-parasitic composition comprising a nicotine salt of coconut oil fatty acid esters of glycerol monosulphate.

3. An anti-parasite comprising a nicotine salt of coconut oil fatty acid esters of diethylene glycol sulphate.

BENJAMIN R. HARRIS.